United States Patent [19]
Jehl et al.

[11] Patent Number: 5,300,626
[45] Date of Patent: Apr. 5, 1994

[54] PROCESS FOR OBTAINING MODIFIED POLYETHYLENE TEREPHTHALATE PILLING-FREE FIBRES ORIGINATING FROM THE POLYMER THUS MODIFIED

[75] Inventors: Denis Jehl, Gauchy; Bernard Millaud, Beaurains; Jean Staron, Saint Chamond, all of France

[73] Assignee: Rhone-Poulenc Fibres, Lyons, France

[21] Appl. No.: 678,844

[22] Filed: Apr. 3, 1991

[30] Foreign Application Priority Data

Apr. 5, 1990 [FR] France ............... 90 04621

[51] Int. Cl.$^5$ ........................... C08G 63/695
[52] U.S. Cl. ................. 528/274; 264/211.14
[58] Field of Search ............ 528/272, 283, 274; 525/437; 524/261; 428/480; 264/176.1, 210.1, 211.14

[56] References Cited

U.S. PATENT DOCUMENTS

| | | | |
|---|---|---|---|
| 3,335,211 | 8/1967 | Mead et al. | 524/493 |
| 3,475,371 | 10/1969 | Stewart et al. | 524/261 |
| 3,917,648 | 11/1975 | McLeod | 524/364 |

FOREIGN PATENT DOCUMENTS 0294912 12/1988 European Pat. Off. .

Primary Examiner—Morton Foelak
Assistant Examiner—Jeffrey Culpeper Mullis
Attorney, Agent, or Firm—Stevens, Davis, Miller & Mosher

[57] ABSTRACT

The present invention relates to a process for obtaining continuously polyethylene terephthalate modified by —SiO— groups in a proportion of 300–700 ppm of Si during the direct esterification reaction between terephthalic acid and ethylene glycol, followed by polycondensation in a known manner by introducing methoxyethyl silicate or propyl silicate at a time when the prepolymer has a weight-average molecular mass of between 9,000 and 16,000, a polydispersity index of between 1.5 and 2, and when it is at a temperature of between 260° and 290° C. and at a pressure of between 1.5 and 2.5 bars, the silicate/prepolymer reaction time being at least 5 minutes.

The present invention also relates to pilling-free fibres originating from the modified polyethylene terephthalate and to a process for obtaining them.

6 Claims, No Drawings

PROCESS FOR OBTAINING MODIFIED POLYETHYLENE TEREPHTHALATE PILLING-FREE FIBRES ORIGINATING FROM THE POLYMER THUS MODIFIED

The present invention relates to a process for obtaining polyethylene terephthalate containing —SiO— groups by direct esterification of terephthalic acid (TA) and of ethylene glycol (EG) and to the polyethylene terephthalate thus obtained.

It also relates to the pilling-free fibres with improved characteristics originating from this polymer and a process for obtaining them.

Fibres based on polyethylene terephthalate (PET) are well known for their properties and their ease in maintenance and use.

However, their use for obtaining textile articles is limited by the "pilling" phenomenon. "Pills" or "pilling" means the formation of small nodules on the surface of the textile articles produced. This results from the fact that the ends of fibres projecting from the surface or free ends of the fibres form balls and, because of the good toughness of the fibres, do not fall but remain adhering to the surface. Mechanical removal of the nodules, such as brushing and shaving is very tedious and costly and, what is more, produces only a poor result because of new "pills" are continually being formed.

Many attempts have been made to overcome this disadvantage.

One of the most widespread means for obtaining pilling-free staple fibres consists of embrittling the fibres. This can be done, for example, by creating microscopic irregularities in the fibre, but the most commonly used method is certainly the reduction in the end-to-end length of the macromolecular chains. However, this produces a decrease in the melt viscosity of the polymer, resulting in problems in spinning, which it has been attempted to solve in various ways. Embrittlement of the fibres also produces a degradation in the processability of the fibres obtained during the spinning and weaving operations.

One of the best known and most widely employed methods consists, according to French Patent No. 1,603,030 to Rhodiaceta, in introducing tri- or tetrafunctional products in the macromolecular chains, enabling the end-to-end length of the macromolecular chains to be reduced while maintaining a high melt viscosity. This reduction increases with the proportion of branching agent and its functionality. This solution generally gives a correct antipilling property which is maintained after the articles are dyed. However, for processability with cotton fibres, fibres of polyethylene terephthalate (PET) modified with branching agents have an elongation which is too high and tenacities which are too low for use in weaving fibre spun yarns.

Another route which is already employed consists in introducing into the macromolecular chains weak chemical bonds which degrade during subsequent treatment in the presence of water or steam.

For example, French Patent No. 2,290,511 proposes to introduce 0.01 to 2% by weight of diphenylsilanediol relative to dimethyl terephthalate (DMT) before the transesterification. However, the elongations at break are too high to permit processability with cotton fibres and the tenacities are too low for running the fibre spun yarns on looms.

French Patient No. 1,589,057 proposes to introduce into the polycondensation a compound of formula:

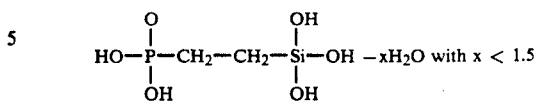

capable of improving the pilling of the fibres and U.S. Pat. No. 3,335,211 describes obtaining fibres exhibiting improved pilling from an anhydrous PET of melt viscosity (MV) of 1,000–6,000 poises (measured at 275° C.), containing 0.1–0.75 gram-atoms of Si per 100 moles of glycol, by introducing into the polycondensation a compound of formula:

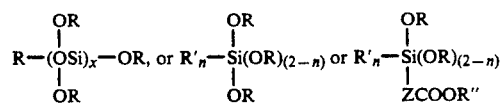

where R, R', R" are carbon or oxyhydrocarbon radicals containing 1 to 6 carbon atoms, Z is a saturated divalent hydrocarbon group containing 1 to 6 carbon atoms, $x=1-20$ and $n=0-2$.

However, after wet treatment, such fibres have elongations which are too long to permit processability as a mixture with cotton fibres and/or tenacities which are too low at the fibre spun yard stage for spun yarns to be employed in weaving.

Modified polyethylene terephthalate fibres have now been found which have, at the same time, a low elongation close to that of cotton, permitting the fibres to be processed by themselves or mixed with cotton fibres, a high tenacity making it possible to obtain fibre spun yarns which are suitable for the weaving operation and which exhibit good antipilling properties, these being prepared from a modified polyethylene terephthalate (PET), originating directly from terephthalic acid (TA) and ethylene glycol (EG).

More particularly, the present invention relates to a continuous process for direct esterification between TA and EG, followed by polycondensation in known manner to obtain PET modified by the continuous introduction of methoxyethyl silicate or propyl silicate in a proportion of 300 to 700 ppm by weight of silicon at a time when the prepolymer has a weight-average molecular mass $M\overline{w}$ of between 9,000 and 16,000, a polydispersity index $I=M\overline{w}/M\overline{n}$ of between 1.5 and 2, and when it is at a temperature of between 260° and 290° C., at a pressure of between 1.5 and 2.5 bars, the silicate/prepolymer reaction time being at least 5 min, preferably at least 7 min.

The present invention also relates to a PET modified with —SiO— groups which are chemically bonded to a macromolecular chains and present in a proportion of 300–700 ppm by weight of silicon, free from ester interchange catalyst residues, and to pilling-free fibres capable of being employed as a mixture with cotton fibres for weaving, additionally having an elongation at break $\leq 25\%$, preferably $\leq 20\%$, a tenacity at break $\geq 40$ cN/tex, preferably $\geq 45$ cN/tex, a boiling water shrinkage of between 1.5 and 6% and a post-dyeing flex abrasion index (FAI) $\leq 6,500$.

The present invention relates to a process for obtaining modified, pilling-free PET fibres with a melt viscosity of between 600 and 1,000 poises (measured at 290° C. and at a shear rate lower than $100\,s^{-1}$), by melt spinning in a known manner, a first drawing in an aqueous bath maintained at a temperature of between 40° and 70° C. to a ratio of between 2.9 and 4.6 ×, a second drawing in the presence of steam at a temperature of between 100° and 110° C. to a ratio of 1.05–1.2 ×, setting at a temperature of between 160° and 200° C., preferably 170°–180° C. at a tension such that the filaments retract to a ratio of 0.95–1 × followed by sizing, drying, crimping and cutting to a length of 3—5 cm.

The modified PET originates from the continuous reaction of direct esterification between TA and excess EG in a known manner, at a temperature of between 270° and 300° C. and under pressure, optionally in the presence of a direct esterification catalyst such as triethanolamine orthotitanate, followed by continuous polycondensation in the presence of known catalysts such as antimony oxide, under vacuum, at a temperature of between 270° and 300° C.; the introduction of methoxyethyl or propyl silicate is performed at the time when the weight molecular mass of the prepolymer is between 9,000 and 16,000, preferably between 11,000 and 14,000, the polydispersity index $\overline{Mw}/\overline{Mn}$ is between 1.5 and 2, preferably 1.7 to 1.9 and where the temperature of the reaction mixture is between 260° and 290° C. and the pressure is between 1.5 and 2.5 bars.

The direct esterification reaction between TA and EG is performed with the removal of water throughout the esterification and polycondensation reactions and it is quite surprising that it is possible to obtain a PET containing 300 to 700 ppm, preferably 400 to 600 ppm, of silicon in the form of —SiO— units fixed in the macromolecular chains without producing the hydrolysis phenomenon which must be absolutely avoided before the spinning, as follows from U.S. Pat. 3,335,211, col. 3, lines 50-70.

Still according to this Patent, it is clear that this phenomenon is easy to avoid when the PET is obtained by ester transesterification, that is to say from dimethyl terephthalate (DMT) and EG, since this reaction is performed only with the release of methanol; in contrast, it is quite astonishing that the modified PET can be obtained without being hydrolysed, using a direct esterification and polycondensation process producing water, a process which, furthermore, has better kinetics, presents fewer risks of polymer degradation and is consequently a process which is more preferable because of being more industrial and economical.

It is essential, furthermore, that the addition of methoxyethyl or propyl silicate should be performed while the polyester has a weight-average molecular mass $\overline{Mw}$ of between 9,000 and 16,000, preferably 11,000 to 14,000. If the addition is made when the $\overline{Mw}$ is too low, the water present during the continuous polymerisation converts the silicate into silica and alcohol and therefore prevents the formation of the —SiO— groups in the macromolecular chains and prevents the polycondensation reaction by blocking the acidic chain ends, because the alcohol released is monofunctional. If, on the contrary, the $\overline{Mw}$ is too high the silicate does not have time to react with the polyester being formed, since a continuous process is taking place.

Similarly if the temperature of the reaction mixture is too low, the reaction does not take place; if the temperature is too high then a polymer degradation is observed.

Equally, the proportion of silicate which is introduced is critical:

below 300 ppm of silicon the antipilling effect of the finished fibres and subsequently of the woven or knitted articles is insufficient, above 700 ppm of silicon the continuous esterification and polycondensation reaction reverses and it is impossible to obtain a spinnable PET.

The modified PET thus obtained contains:

—SiO— groups chemically bonded to the polymer in a proportion of 300 to 700 ppm of silicon calculated relative to the polyester, preferably 400 to 600 ppm of Si, and is free from catalyst residues which are specific to the terephthalic ester interchange reactions.

In addition, it has a COOH end group content $\leq 20$ g/t, preferably $\leq 12$ g/t and a melt viscosity which is generally between 600 and 1,000 poises at 290° C., preferably between 700 and 900 poises, measured at a shear rate $\leq 100$ s$^{-1}$.

After the polycondensation the modified polyester of weight-average molecular mass of between 25,000 and 35,000 is spun continuously through a fibre-type die comprising a large number of holes (for example 800–1,500) in which the flow rate varies as a function of the desired count. The filaments, taken up at a speed which is generally between 800 and 1,500 m/min, are then drawn firstly in an aqueous bath maintained at 40°–70° C., preferably 50°–60° C., to a ratio of 2.9–4.6 ×, preferably between 3.5–4.5 ×, then again in the presence of steam at 100°–110° C., to a ratio of 1.05–1.2 ×, by means of any known device, so as to obtain an overall ratio of between 3.5 and 4.8 ×, preferably between 4 and 4.8 ×. The filaments are then set under a tension such that they undergo a slight retraction of 0.95 to 1 ×, and are then sized and dried on a belt at approximately 100° C. and are then crimped and cut to a length of 3-5 cm.

The yarns thus obtained have:
an elongation $\leq 25\%$, preferably $\leq 20\%$
a shrinkage of between 1.5 and 6%, preferably 4 to 6%
a tenacity at break $\geq 40$ cN/tex, preferably $\geq 45$ cN/tex and, after dyeing:
a flex abrasion index (FAI) $\leq 6,500$, preferably $\leq 6,000$.

The FAI enables the antipilling property to be assessed on the fibres.

FAI means the measurement of the flex abrasion resistance, which consists in determining the breaking strength of fibres which are kept stretched over a steel wire whose diameter is a function of the fibre count at a folding angle of 110° and driven in a to-and-fro motion in a condition atmosphere (T=22° C.±2° C.—RH: 65%±2%); the flex abrasion index, FAI, is equal to the number of cycles before breaking. The FAI values are related to the filament count of the fibres and are proportionately higher the lower the count.

The fibres for cotton generally have a count $\leq$ dtex/filament. The fibres obtained have an elongation which approaches that of cotton, thus allowing good processability with cotton fibres, a high tenacity enabling them to be run on looms without risks of breaking of fibre spun yarns and a sufficiently low pilling after dyeing on the articles thus obtained, on wovens in particular. They make it possible to avoid subsequent finishing treatments such as singeing or brushing/shaving, which are industrially demanding and costly and are necessarily employed on woven fabrics obtained from conventional fibres. The fibres thus obtained are easily convertible into fibre spun yarns by conventional ring or open-end spinning techniques, either by themselves or mixed with cotton spun yarns, using a process which is simple and inexpensive on industrial scale.

In the examples which follow, the mechanical characteristics are determined by conventional tensile measurements on a manual or automatic tensometer, at a constant shear rate on a fibre specimen subjected to lengthwise pull until it breaks; since the tensometer is connected to a computer, the following numerical values are supplied, which correspond to a mean of 30 measurements:

initial count in dtex
the force at break
the tenacity A
the elongation at break $$\text{Tenacity } A \text{ } (cN/tex) = \frac{\text{Force at break } (cN)}{\text{Initial count } (Tex)}$$

The measurement of the shrinkage of a yarn consists in determining the change in length of a yarn specimen under standard pretension (50 mg/dtex) after a heat treatment. In the case of the determination of boiling water shrinkage, the heat treatment is as follows:

15 min in boiling water
10 min in an oven at 80° C.
1 h in a conditioned atmosphere % shrinkage =

$$\frac{\text{Initial length } - \text{ length after heat treatment}}{\text{Initial length}} \times 100$$

The warp and weft fabrics prepared according to the invention retain good antipilling properties evaluated according to the R.T.P.T. test and good tensile measurements on spun yarns and on fabric in respect of the tenacity breaking and elongation when compared with commercially known spun yarns and fabrics.

The R.T.P.T. test applies to woven fabrics (or knits) based on fibres according to the method described in the AFNOR standard G 07-121. It is carried out as follows:

three 100-cm$^2$ circular specimens whose periphery is hardened by a deposit of neoprene-based adhesive are subjected for a given time to stirring in a R.T.P.T. chamber whose interior is lined with a neoprene tape. The pilling of the specimens is graded visually by comparison with photographic standards (1: very many pills → 5: no pill).

Tensometric measurements on spun yarns:

These are carried out by means of an Uster trademark automatic tensometer on 50-cm specimens under a pretension of 400 g. The tensometer is adjusted beforehand to a breaking time of 20 seconds. The instrument gives 1 measurement of elongation at break.

$$RKM = \frac{\text{Breaking load (g)} \times \text{mean metric number}}{1000}$$

Total strength = breaking load in g.

The values correspond to averages over 120 measurements.

Tensometric measurements on fabrics:

The tests are performed in the weft and warp directions.

A frayed fabric specimen 5 cm in width is subjected to a lengthwise pull until it breaks.

The force in daN and the elongation in % at the break point are recorded.

Measurement of the number of end groups:

The measurement of the number of end groups of the modified PET according to the invention is performed as follows:

exactly approximately 3 g of granular polymer are dissolved in 50 ml of ortho-cresol at 90° C. and an acidimetric determination is performed using 0.02 N aqueous sodium hydroxide.

EXAMPLE 1

A modified PET is prepared continuously by direct esterification and polycondensation of TA and EG with a TA/EG molar ratio = 1.15 under the following conditions:

1) slurrying TA with ethylene glycol in a first stirred reactor in the presence of triethanolamine orthotitanate known in the trade under the trademark Natol S in a proportion of 4 ppm of Ti,
2) the slurried mixture is then heated in a second reactor to 275° C. at a pressure of 6.6 bars with the removal of water,
3) the prepolymer is then heated to 278° C. at 1 bar in a third reactor,
4) the product then moves to a fourth reactor in the presence of a glycolic solution of Sb oxide at a rate of 17.4 l/hour (200 ppm Sb) and 5.9 kg/hour of TiO$_2$ in suspension in 19 l/hour of EG, where the product is heated to 282° C. at a pressure of 35 torr,
5) then, at the outlet of the fourth reactor, methoxyethyl silicate is introduced continuously at a rate of 8.3 l/hour (that is 500 ppm of Si), while PET has a weight molecular mass of 11,570, a polydispersity index of 1.51 and while the pressure is approximately 2 bars and the temperature 280° C.,
6) the mixture is then introduced into a last stirred reactor, heated to 283° C. at a pressure of 2 torr, to complete the polycondensation. The reaction time between the silicate and the prepolymer is approximately 6 minutes.

The modified PET with a melt viscosity of 1,000 poises, maintained at 280° C. is conveyed directly to a spinning frame comprising 30 dies of 156-mm diameter, pierced with 1226 holes of 0.28-mm diameter, at a flow rate of 790 g/min per die. The filaments are cooled by two miniblowers situated on either side of the die and offset relative to each other; the air is blown transversely in relation to the bundle of filaments at a temperature of 23° C. The filaments are then collected to form a sliver; the 30 slivers are sized individually and are then assembled and run over 6 rollers controlling the speed and then between 2 crenellated rollers at a speed of 1,100 m/min and are recovered in a spinning can.

40 slivers such as obtained above are assembled and the rope is then sized and then drawn firstly in a aqueous bath 4 m in length and maintained at approximately 50° C. to a draw ratio of 3.6 × and then secondly in a tube 8 m in length containing steam at 110° C., to a ratio of 1.14 ×. The overall ratio is 4.10 ×.

The rope of filaments is then set under tension with a retraction ratio of 0.98 × on 12 rollers heated to 175° C. at a speed of 200 m/min, is sized, crimped in a crimping box and is then dried at 100° C. by high-frequency heating.

The rope is cut into the form of fibres of a mean length of 35–45 mm.

The characteristics of the fibres obtained are as follows:

| Count dtex/filament | 1.61 |
|---|---|
| Tenacity in cN/tex | 44.1 |
| Elongation in % | 24.8 |
| Shrinkage in % | 4.7 |
| FAI: | |
| before dyeing | 5,700 |
| after dyeing | 4,800 |

Dyeing is carried out at a temperature of 130° C. for 30 min and under pressure.

Using the fibres obtained above, fibre spun yarns are prepared as a 50/50 mixture with carded cotton fibres of metric count 50/1 (50 m in 1 g) by an open-end process with a rotor speed of 65,000 rev/min.

The fibre spun yarn obtained, intended for weaving, has the following characteristics:

| Twist turns/meter | 919 Z direction |
|---|---|
| Elongation at break % | 8.9 |
| Metric count (Nm) | 48.9 |
| Total strength at break (g) | 260 |

Using the above fibre spun yarns a fabric is produced, in which both the warp and the weft consist of the above 50/50 fibre spun yarns on a rapier loom (Saurer 400 trademark) under the following conditions:
cloth weave
warp sized in the usual manner
textile structure: warp 30 yarns/cm weft 27 strokes/cm
weight per m²: 118 g The fabric was dyed at 125° C. in the case of the polyester and 80° C. in the case of the cotton after heat treatment at 180° C.

The fabric thus obtained has the following tensile measurements on fabric:

| Break strength (kg) | | Break elongation % | |
|---|---|---|---|
| warp | weft | warp | weft |
| 46.5 | 41.4 | 14.2 | 20.1 |

R.T.P.T. pilling test on fabric (AFNOR standard G-07-121)

| 5' | 15' | 30' | 45' | 55' |
|---|---|---|---|---|
| 4 | 3 | 3 | 3 | 4 |

When a fabric is subjected to a brushing/shaving treatment usually employed to improve the pilling characteristics of the fabrics, the R.T.P.T. test gives the following results:

| 5' | 15' | 30' | 45' | 55' |
|---|---|---|---|---|
| 4 | 4 | 4 | 4 | 4 |

Such a brushing/shaving treatment, which is costly on industrial scale, becomes superfluous.

EXAMPLE 2 (COMPARATIVE)

Example 1 is reproduced, except for the steam setting treatment, which is carried out at 140° C. without tension.

The characteristics of the yarns obtained are as follows:

| Count dtex/filament | 1.80 |
|---|---|
| Tenacity in cN/tex | 33.3 |
| Elongation in % | 65 |
| Shrinkage in % | 3.6 |
| FAI: | |
| before dyeing | 5,900 |
| after dyeing | 5,050 |

The fibres obtained are converted into fibre spun yarns mixed 50/50 with carded cotton fibres, of metric count 48.9 using the open-end process. The fibre spun yarns obtained exhibit the following characteristics:

| Nm | 48.9 |
|---|---|
| Elongation at break % | 7.9 |
| Total strength (g) | 225 |

The fibre spun yarns exhibit poor characteristics, in particular strength, which are due to the inadequate characteristics of the fibres themselves.

They were converted into fabrics with mediocre performance on fabrics and a poor yield, making such fibres and spun yarns of no interest in an industrial application.

Fabric characteristics:

| Break strength (kg) | | Break elongation % | |
|---|---|---|---|
| warp | weft | warp | weft |
| 39.2 | 35.3 | 11.9 | 19.5 |

EXAMPLE 3 (COMPARATIVE)

Example 1 is reproduced without introducing silicate and with operation at higher polycondensation temperatures of the order of 290° C. The PET has a melt viscosity of approximately 2,000 poises.

The process for obtaining the yarns is identical except for the take-up speed: 1,650 m/min, the drawing in an aqueous bath to a ratio of 2.59 and the heat setting temperature of 185° C. Characteristics of the yarns obtained:

| Count dtex/filament | 1.57 |
|---|---|
| Tenacity in cN/tex | 57.2 |
| Elongation in % | 23 |
| Shrinkage in % | 4.2 |
| FAI: before and after dyeing | 35,000 |

It was possible to obtain fibre spun yarns without any problem by the process described in Example 1, as a 50/50 mixture with cotton fibres. Spun yarn characteristics:

| Metric count (Nm) | 48.9 |
|---|---|
| Elongation at break % | 9.4 |

-continued

| | |
|---|---|
| Total strength (g) | 303 |

A fabric was also obtained as shown in Example 1.

| Break strength (kg) | | Break elongation % | |
|---|---|---|---|
| warp | weft | warp | weft |
| 39.2 | 35.3 | 11.9 | 19.5 |

R.T.P.T. test on fabric (AFNOR standard G-07-121)

| | 5' | 15' | 30' | 45' | 55' |
|---|---|---|---|---|---|
| without brushing/shaving | 1 | 2 | 1 | 1 | 1 |
| with brushing/shaving | 4 | 3 | 2 | 2 | 2 |

The FAI tests on the fibres are very poor and although fabrics with good strength have been obtained, the pilling tests on fabrics even with a brushing/shaving treatment remain quite inadequate.

EXAMPLE 4 (COMPARATIVE, TMP)

Example 1 is reproduced, methoxyethyl silicate being replaced with trimethylolpropane (TMP) introduced between the 3rd and 4th reactor in a proportion of 0.6 mol% relative to terephthalic acid (according to FR 1,603,030).

The PET obtained, of same melt viscosity as according to Example 1, is obtained as shown in Example 1, except for the following parameters:

| | | | |
|---|---|---|---|
| die flow rate | 650 g/min | | |
| bath drawing | ratio: 2.7 × | temperature: | 50° C. |
| steam drawing | ratio: 1.1 × | temperature: | 110° C. |
| setting under tension | total ratio: 2.97 × | temperature: | 170° C. |

The draw ratio is a limiting ratio; filament breakage takes place above it.

| | |
|---|---|
| Count dtex/filament | 1.62 |
| Tenacity in cN/tex | 33.5 |
| Elongation in % | 32.8 |
| Shrinkage in % | 3.6 |
| FAI before and after dyeing | 5,000 |

The tenacity and elongation characteristics, outside the invention, did not make it possible to obtain fibre spun yarns, by themselves or mixed with cotton fibres, by the open-end process under industrial conditions.

EXAMPLE 5

Example 1 is reproduced in respect of obtaining polyethylene terephthalate by using 600 ppm of Si in the form of methoxyethyl silicate introduced continuously at a rate of 10.2 l/hour. Spinning and drawing are performed as in Example 1 to a ratio of 33.3 in an aqueous bath maintained at 65° C. and then in the presence of steam to a ratio of 1.23, the overall ratio being 4.1 ×. The rope of filaments is then set under tension with a retraction ratio of 0.98 × on 12 rollers heated to 170° C., and is sized, crimped and dried under the conditions described in Example 1.

The rope is cut into the form of fibres with a means length of 35-45 mm. The characteristics of the fibres are as follows:

| | |
|---|---|
| Count dtex/filament | 1.52 |
| Tenacity in cN/tex | 40 |
| Elongation in % | 19.8 |
| Shrinkage in % | 4.2 |
| FAI before dyeing | 5,400 |
| FAI after dyeing | 4,400 |

Dyeing was performed as in Example 1.

Using the fibres obtained above, fibre spun yarns are prepared as a 50/50 mixture with carded cotton fibres, by an open-end process, one with a rotor speed of 72,000 rev/min (5A), the other with a rotor speed of 92,000 rev/min (5B).

The fibre spun yarns obtained, intended for weaving, have the following characteristics:

| | 5A | 5B |
|---|---|---|
| Metric count | 50.4 | 50.2 |
| Strength g | 260 | 236 |
| Elongation at break % | 7.8 | 6.4 |
| Twist turns/min | 919 Z | 919 Z |

Using the above fibre spun yarns, two fabrics A and B are produced, in which the warp and the weft consist of the above 50/50 fibre spun yarns.

The fabrics are produced on a rapier loom (Saurer trademark) under the following conditions:
cloth weave
warp sized in the usual manner
fabric structure: warp 30 yarns/cm weft 26 strokes/cm
weight per m²: 115 g The fabric was dyed at 125° C. in the case of the polyester and 80° C. in the case of the cotton after heat treatment at 180° C.

R.T.P.T. test on fabric (AFNOR standard G-07-121)

| | 5' | 15' | 30' | 45' | 55' |
|---|---|---|---|---|---|
| A | 4/5 | 3 | 1 | 4 | 4/5 |
| B | 4 | 3 | 4 | 4 | 5 |

It is interesting to find that the fibre spun yarns according to the invention withstand high speeds by the open-end process, which represents a major economic industrial advantage. Moreover, the above pilling tests show that the brushing/shaving treatment is unnecessary on the fabrics produced from the fibres according to the invention.

EXAMPLE 6

A modified PET is prepared continuously by direct esterification and polycondensation of TA and EG with a TA/EG molar ration = 1.15 under the following conditions:

1) slurrying of TA with ethylene glycol in a first stirred reactor in the presence of triethanolamine orthotitanate known in the trade under the trademark Natol S in a proportion of 4 ppm of Ti,
2) the slurried mixture is then heated in a second reactor to 275° C. at a pressure of 6.6 bars with the removal of water, 3) the prepolymer is then heated to 278° C. at 1 bar in a third reactor,
4) the product then moves to a fourth reactor in the presence of a glycolic solution of Sb oxide at a rate of 17.4 l/hour (200 ppm Sb) and 5.9 kg/hour of TiO$_2$ in suspension in 19 l/hour of EG, where the product is heated to 282° C. at a pressure of 35 torr,
5) then, at the outlet of the fourth reactor, propyl silicate is introduced continuously at a rate of 7.3 kg/hour (that is 545 ppm of Si), while the PET has a weight molecular mass of 11,570, a polydispersity index of 1.51 and while the pressure is approximately 2 bars and the temperature 280° C.,
6) the mixture is then introduced into a last stirred reactor, heated to 283° C. at a pressure of 2 torr, to complete the polycondensation.

The reaction time between the silicate and the prepolymer is approximately 6 minutes.

The modified PET with a melt viscosity of 850 poises, maintained at 280° C. is conveyed directly to a spinning frame comprising 30 dies, of 156-mm diameter, pierced by 1226 holes 0.28 in diameter, at a flow rate of 790 g/min per die. The filaments are cooled by two miniblowers situated on either side of the die and offset relative to each other; air is blown transversely in relation to the bundle of filaments at a temperature of 23° C. The filaments are then collected to form a sliver; the 30 slivers are sized individually and are then collected and run over 6 rollers controlling the speed and then between 2 crenellated rollers at a speed of 1,100 m/min and are recovered in a spinning can.

40 slivers such as obtained above are assembled and the rope is sized and then drawn firstly in an aqueous bath 4 m in length maintained at approximately 50° C. to a draw ration of 3.29 × and then secondly in a tube 8 m in length containing steam at 110° C. to a ratio of 1.23 ×. The overall ratio is 4.05 ×.

The rope of filaments is then set under tension with a retraction ratio of 0.98 × on 12 rollers heated to 175° C. at a speed of 200 m/min and is sized, crimped in a crimping box and then dried at 100° C. using high-frequency heating.

The rope is cut into the form of fibres with a mean length of 35—45 mm.

The characteristics of the fibres obtained are as follows:

| Count dtex/filament | 1.56 |
| --- | --- |
| Tenacity in cN/tex | 41 |
| Elongation in % | 22 |
| Shrinkage in % | 4.1 |
| FAI: | |
| before dyeing | 7,000 |
| after dyeing | 4,800 |

Dyeing is performed at a temperature of 130° C. for 30 min and under pressure.

Using the fibres obtained above, fibre spun yarns are prepared as a 50/50 mixture with carded cotton fibres of metric count 50/1 (50 m in 1 g) by an open-end process with a rotor speed of 65,000 rev/min. The fibre spun yarn obtained, intended for weaving, has the following characteristics:

| Twist turns/meter | 919 Z direction |
| --- | --- |
| Elongation at break % | 8.5 |
| Metric count (Nm) | 49 |

-continued

| Total strength at break (g) | 245 |
| --- | --- |

Using the above fibre spun yarns, a fabric is produced in which both the warp and the weft consist of the above 50/50 fibre spun yarns, on a rapier loom (Sauer 400 trademark) under the following conditions:
cloth weave
warp sized in the usual manner
fabric structure: warp 30 yarns/cm weft 27 strokes/cm
weight per m$^2$: 118 g The fabric was dyed at 125° C. in the case of the polyester and 80° C. in the case of the cotton after heat treatment at 180° C.

The fabric thus obtained has the following tensile measurements on fabric:

| Break strength (kg) | | Break elongation % | |
| --- | --- | --- | --- |
| warp | weft | warp | weft |
| 45 | 40.9 | 14.2 | 20.1 |

R.T.P.T. pilling test on fabric (AFNOR standard G-07-121)

| 5' | 15' | 30' | 45' | 55' |
| --- | --- | --- | --- | --- |
| 4 | 3 | 3 | 3 | 4 |

When a fabric is subjected to a brushing/shaving treatment usually employed to improve the pilling characteristics of the fabrics, the R.T.P.T. test gives the following results:

| 5' | 15' | 30' | 45' | 55' |
| --- | --- | --- | --- | --- |
| 4 | 4 | 4 | 4 | 4 |

Such a brushing/shaving treatment which is costly on an industrial scale, becomes superfluous.

We claim:
1. A pilling-free fiber capable of being employed in a mixture with at least one cotton fiber for weaving applications, based on polyethylene terephthalate modified with —SiO— groups bonded chemically to the macromolecular chains in an amount of 300 to 700 ppm of silicon and having:
an elongation at break greater than zero and less than 25%;
a tenacity greater than or equal to 40 cN/tex;
a boiling water shrinkage of between 1.5 and 6%; and
a flex abrasion index after dyeing greater than zero and less than or equal to 6,500 at 130° C. and under pressure;
said modified polyethylene terephthalate being obtained by the process comprising the continuous reaction of direct esterification between terephthalic acid and ethylene glycol and modified by the introduction of methoxyethyl or propyl silicate in an amount of 300–700 ppm of silicon at a time when the prepolymer has a molecular mass of between 9,000 and 16,000, a polydispersity index of between 1.5 and 2, and when the temperature of the reaction is between 260° and 290° C. and at a pressure of between 1.5 and 2.5 bars, the silicate/prepolymer reaction time being at least 5 min, wherein after polycondensation, the polyester is drawn in the presence of steam.

2. The fiber according to claim 1, wherein the elongation at break is greater than zero and less than or equal to 20%.

3. The fiber according to claim 1, wherein the tenacity is greater than or equal to 45 cN/tex.

4. The fiber according to claim 1, wherein the boiling water shrinkage is between 4 and 6%.

5. The fiber according to claim 1, wherein the flex abrasion index is greater than zero and less than or equal to 6000.

6. The fiber according to claim 1, wherein the count per filament is greater than zero and less than or equal to 2 dtex per filament.

* * * * *